United States Patent
Matsumoto et al.

(10) Patent No.: US 7,023,689 B2
(45) Date of Patent: Apr. 4, 2006

(54) SOLID ELECTROLYTIC CAPACITOR

(75) Inventors: Takayuki Matsumoto, Takeo (JP);
Tetsuyuki Sakuda, Imari (JP);
Nobuhiro Honda, Saga (JP);
Shigekatsu Ohnishi, Higashimatsuyama (JP); Naoyuki Shiozawa, Sakado (JP);
Hideaki Kojima, Kawagoe (JP)

(73) Assignees: Sanyo Electric Co., Ltd., Moriguchi (JP); Saga Sanyo Industries Co., Ltd., Saga (JP); Taiyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/973,411

(22) Filed: Oct. 27, 2004

(65) Prior Publication Data

US 2005/0254198 A1    Nov. 17, 2005

(30) Foreign Application Priority Data

May 13, 2004  (JP) ............................. 2004-143064

(51) Int. Cl.
*H01G 9/00*    (2006.01)

(52) U.S. Cl. ...................... 361/523; 361/532; 361/516; 29/25.03

(58) Field of Classification Search ................ 361/523, 361/524, 525, 528–530, 531–532, 526, 516; 29/25.03
See application file for complete search history.

(56) References Cited

U.S. PATENT DOCUMENTS

| 4,164,005 | A  | * | 8/1979  | Cheseldine ................ 361/540 |
| 6,462,936 | B1 | * | 10/2002 | Fujimoto et al. ........... 361/525 |
| 6,580,601 | B1 | * | 6/2003  | Hamada et al. ............. 361/523 |

FOREIGN PATENT DOCUMENTS

| JP | 8-148392  | 6/1996 |
| JP | 10-242000 | 9/1998 |

* cited by examiner

*Primary Examiner*—Anthony Dinkins
(74) *Attorney, Agent, or Firm*—Armstrong, Kratz, Quintos, Hanson & Brooks, LLP

(57) ABSTRACT

A solid electrolytic capacitor includes an anode body formed with a dielectric oxide film, a laminate cathode provided on the dielectric oxide film, a cathode lead frame provided on the cathode, and an anode lead frame attached to a lead portion of the anode body. The laminate cathode includes a solid electrolyte layer, and a mixture layer of a mixture of silver flake particles and carbon particles provided directly on an outer surface of the solid electrolyte layer.

5 Claims, 5 Drawing Sheets

FIG. 11

| | Structure of laminate cathode 5 excluding layer 3 | Specific surface area (m²/g) of carbon particles | Weight ratio between silver particles and carbon particles | Type of silver particles |
|---|---|---|---|---|
| Prior art | Conventional two layers | — | 65:0 | Silver flake particles |
| Example 1 | Mixture layer | 800 | 65:3 | Silver flake particles |
| Example 2 | Mixture layer | 800 | 65:2 | Silver flake particles |
| Example 3 | Mixture layer | 800 | 65:1 | Silver flake particles |
| Example 4 | Mixture layer | 1200 | 65:1 | Silver flake particles |
| Comparative Example 1 | Silver paste layer | — | 65:0 | Silver flake particles |
| Comparative Example 2 | Mixture layer | 800 | 65:7 | Silver flake particles |
| Comparative Example 3 | Mixture layer | 800 | 65:0.5 | Silver flake particles |
| Comparative Example 4 | Mixture layer | 800 | 65:3 | Silver particles of indefinite shape |

FIG. 12

| Static capacitance (μF) | Average | Maximum | Minimum |
|---|---|---|---|
| Prior art | 14.8 | 15.5 | 14.3 |
| Example 1 | 14.7 | 15.3 | 14.3 |
| Example 2 | 15.0 | 15.6 | 14.8 |
| Example3 | 14.8 | 15.4 | 14.4 |
| Example 4 | 14.9 | 15.5 | 14.6 |
| Comparative Example 1 | 14.0 | 14.8 | 13.6 |
| Comparative Example 3 | 14.6 | 15.2 | 13.9 |
| Comparative Example 3 | 14.4 | 14.9 | 13.8 |

FIG. 13

| ESR (mΩ) | Average | Maximum | Minimum | Specific resistance ($10^{-4}$ Ω·cm) |
|---|---|---|---|---|
| Prior art | 70.5 | 72.4 | 68.1 | 0.7 |
| Example 1 | 65.0 | 66.7 | 63.1 | 0.1 |
| Example 2 | 61.6 | 63.9 | 60.3 | 0.4 |
| Example 3 | 64.6 | 67.2 | 62.1 | 0.6 |
| Example 4 | 61.9 | 64.4 | 59.5 | 0.7 |
| Comparative Example 1 | 681.1 | 785.3 | 551.2 | 0.7 |
| Comparative Example 3 | 121.7 | 135.8 | 111.1 | 0.7 |
| Comparative Example 4 | 159.1 | 219.0 | 101.4 | 8.0 |

FIG. 14

| Leak current ($\mu$A) | Average | Maximum | Minimum |
|---|---|---|---|
| Prior art | 0.3 | 1.0 | 0.1 |
| Example 1 | 0.4 | 0.9 | 0.1 |
| Example 2 | 0.4 | 0.8 | 0.1 |
| Example 3 | 0.3 | 1.1 | 0.1 |
| Example 4 | 0.3 | 0.9 | 0.1 |
| Comparative Example 1 | 0.4 | 1.2 | 0.1 |
| Comparative Example 3 | 0.5 | 1.0 | 0.1 |
| Comparative Example 4 | 0.4 | 1.0 | 0.1 |

# SOLID ELECTROLYTIC CAPACITOR

FIELD OF THE INVENTION

The present invention relates to a chip-type solid electrolytic capacitor.

BACKGROUND OF THE INVENTION

The applicant of the present invention previously proposed a chip-type solid electrolytic capacitor as shown in FIG. 4 (see Japanese Unexamined Patent Publication No. HEI8-148392(1996)).

As shown in FIG. 4, the solid electrolytic capacitor 1 includes a capacitor element 2 having lead frames 9, 90 provided on a lower surface thereof. The capacitor element 2 is encapsulated in a housing 7 of a synthetic resin. The lead frames 9, 90 are each bent along two edges over peripheral surfaces of the housing 7. The capacitor element 2 includes an anode body 20 of a valve metal formed with a dielectric oxide film 21, and a laminate cathode 5 provided on the dielectric oxide film 21. The laminate cathode 5 includes a solid electrolyte layer 3, a carbon layer 6 and a silver paste layer 60. The valve metal herein means a metal to be formed with a highly dense and durable dielectric oxide film by electrolytic oxidation, and examples thereof include Al (aluminum), Ta (tantalum), Ti (titanium) and Nb (niobium). Exemplary solid electrolytes for the solid electrolyte layer 3 include electrically conductive polymers such as polythiophenes and polypyrroles.

The carbon layer 6 and the silver paste layer 60 are completely different in particle diameters, electrical characteristics and the like, so that a contact resistance occurs between the carbon layer 6 and the silver paste layer 60. This increases the ESR (equivalent series resistance) of the solid electrolytic capacitor 1. Therefore, a three-layer structure is proposed which includes a mixture layer of a mixture of carbon powder and silver powder provided between the carbon layer 6 and the silver paste layer 60 (see Japanese Unexamined Patent Publication No. HEI10-242000(1998)). With this arrangement, the adhesion of the carbon layer 6 to the mixture layer is increased by the carbon powder contained in the mixture layer, and the adhesion of the silver paste layer 60 to the mixture layer is increased by the silver powder contained in the mixture layer, whereby the ESR of the solid electrolytic capacitor is reduced.

Thus, the ESR is reduced by providing the carbon powder/silver powder mixture layer between the carbon layer 6 and the silver paste layer 60. The carbon layer 6 and the silver paste layer 60 are each formed by performing a coating operation once to several times and then performing a heat treatment, so that long production time is required for the production of the solid electrolytic capacitor 1. The formation of the carbon powder/silver powder mixture layer between the carbon layer 6 and the silver paste layer 60 further prolongs the production time, thereby increasing the production costs. Omission of either of the carbon layer 6 and the silver paste layer 60 may reduce the production time, but is not practical for the following reasons.

Where the cathode is produced by forming the silver paste layer directly on the solid electrolyte layer 3 as shown in FIGS. 5 and 6, for example, the contact resistance is increased with a smaller number of contacts between the solid electrolyte layer and surfaces of silver particles contained in the silver paste layer. Therefore, the ESR is increased even with the highly electrically conductive silver powder.

On the other hand, where the carbon layer is formed directly on the solid electrolyte layer 3 as shown in FIGS. 7 and 8, the contact resistance is reduced with a greater number of contacts between the solid electrolyte layer and surfaces of carbon particles contained in the carbon layer. However, carbon has a lower electrical conductivity than silver. Therefore, even if carbon having a relatively high conductivity is used, a desired level of electrical conductivity cannot be provided thereby to increase the ESR.

Therefore, a two-layer structure including the silver paste layer and the carbon layer is employed so as to electrically connect the solid electrolyte layer to the silver paste layer through the carbon layer having a reduced contact resistance in the cathode, thereby maintaining the ESR at a practical level.

In view of the foregoing, the inventor of the present invention has conceived the idea of reducing the production time while reducing the ESR as compared with the prior art. In the prior art, a silver paste for the conventional silver paste layer is prepared by kneading silver powder with a binder such as an epoxy resin or the like. The electrical resistance of the silver paste is measured, as shown in FIG. 9, by spreading the silver paste on a planer plate 66 and abutting electrodes 67, 67 with opposite ends of the resulting silver paste layer 65. This implicitly means that the paste was developed with the aim of reducing the resistance of the silver paste layer as plane direction measured (in X- and Y-directions). Therefore, the inventor conducted intensive studies in view of the fact that the conventional silver paste and the cathode 5 prepared by using the silver paste were developed without the aim of reducing an electrical resistance as measured along perpendicular direction of the capacitor element (in a Z-direction).

SUMMARY OF THE INVENTION

It is therefore an object of the present invention to provide a solid electrolytic capacitor which features a lower ESR and a shorter production time.

The solid electrolytic capacitor according to the present invention comprises an anode body 20 formed with a dielectric oxide film 21, a laminate cathode 5 provided on the dielectric oxide film 21, and lead frames 9 and 90 respectively provided on the laminate cathode 5 and the anode body 20, wherein the laminate cathode 5 includes a solid electrolyte layer 3 and a mixture layer 4 of a mixture of silver flake particles and carbon particles provided directly on an outer surface of the solid electrolyte layer 3.

As the result of the studies, the inventor found it important to reduce the specific resistance as measured in the X- and Y-directions as well as to reduce the resistance of a capacitor element 2 as measured in the Z-direction for the reduction of the ESR. More specifically, the inventor experimentally confirmed that the ESR of the capacitor cannot be reduced simply by reducing the specific resistance because the ESR significantly varies even with the use of silver pastes having the same specific resistance. Further, the inventor found that the reduction of the ESR can be achieved by: (a) reducing an inter-layer contact resistance between the solid electrolyte layer 3 and an electrically conductive layer such as of carbon and silver in the laminate cathode 5; (b) reducing an inter-particle contact resistance of the electrically conductive particles in the laminate cathode 5; and (c) reducing a contact resistance between the laminate cathode 5 and an adhesive silver paste.

In view of this, the mixture layer 4 of the mixture of the silver flake particles and the carbon particles is provided directly on the outer surface of the solid electrolyte layer 3 in the present invention. The carbon particles have a smaller particle size than the silver flake particles, so that the carbon particles are inserted between the solid electrolyte layer 3 and the silver flake particles and between the silver flake particles. Thus, the carbon particles auxiliarily increase the areas of contact between the silver flake particles and the solid electrolyte layer 3 and between the adjacent silver flake particles. That is, the electrical conduction between the solid electrolyte layer 3 and the silver flake particles and the auxiliary electrical conduction between the carbon particles increase the electrical conduction in the Z-direction in the interface between the solid electrolyte layer 3 and the mixture layer 4 composed of the silver flake particles and the carbon particles, as shown in FIGS. 2 and 3, as if parallel pseudo circuits were provided in the interface. Such an effect is provided not only in the interface but also between the silver flake particles. As a result, the ESR is reduced.

The mixture layer 4 of the mixture of the silver flake particles and the carbon particles is provided directly on the solid electrolyte layer 3. Therefore, the production time is reduced as compared with the prior art in which the carbon layer 6 and the silver paste layer 60 are provided on the solid electrolyte layer 3.

BRIEF DESCRIPTION OF THE DRAWINGS

FIG. 11 is a table illustrating the characteristics of the prior art, Examples 1 to 4 and Comparative Examples 1 to 4; and FIGS. 12 to 14 are tables illustrating the results of measurement performed on solid electrolytic capacitors of the prior art, Comparative Examples 1, 3 and 4, and Examples 1 to 3.

DETAILED DESCRIPTION OF THE PREFERRED EMBODIMENT

One embodiment of the present invention will hereinafter be described in detail with reference to the attached drawings. In the present invention, silver flake particles are used as silver powder, and generally referred to as silver particles unless otherwise specified.

Figure 1:
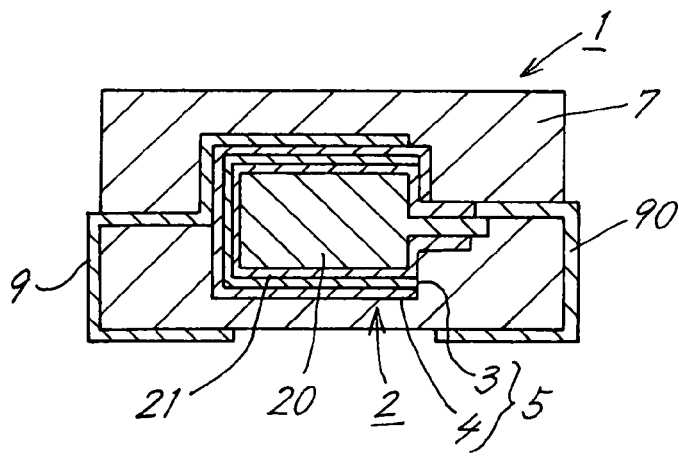
FIG. 1 is a sectional view of a solid electrolytic capacitor as seen from the front side.

FIG. 1 is a sectional view of a solid electrolytic capacitor 1 as seen from the front side. The solid electrolytic capacitor 1 includes a capacitor element 2, and an anode lead frame 90 and a cathode lead frame 9 attached to a lower face of the capacitor element 2 by an adhesive silver paste or the like. The capacitor element 2 is encapsulated in a housing 7 of a synthetic resin. The capacitor element 2 includes an anode body 20 of a valve metal (more specifically, a sintered tantalum compact) formed with a dielectric oxide film 21, and a laminate cathode 5 provided on the dielectric oxide film 21. The laminate cathode 5 includes a solid electrolyte layer 3, and a mixture layer 4 composed of a mixture of silver flake particles and carbon particles. The mixture layer 4 is a feature of this embodiment. As set forth in claim 3, the cathode 5 and the cathode lead frame 9 are connected to each other by the adhesive silver paste.

A production method for the capacitor element 2 of FIG. 1 will briefly be explained. First, a valve metal sintered body is prepared as an anode body 20, and then a part of the anode body 20 is immersed in a 0.01 to 0.02 wt % phosphoric acid aqueous solution or adipic acid aqueous solution for electrolytic oxidation, whereby a dielectric oxide film 21 is formed. In turn, the part of the anode body 20 formed with the dielectric oxide film 21 is immersed in a solution containing 3,4-ethylenedioxythiophene and p-toluene ferric sulfonate dissolved in a butanol solvent, whereby a solid electrolyte layer 3 of polythiophene is formed on the dielectric oxide film 21. Then, a mixture layer 4 of a mixture of silver flake particles and carbon particles is formed on the solid electrolyte layer 3. Thus, the capacitor element 2 is provided. After lead frames 9 and 90 are attached to the capacitor element 2 by an adhesive silver paste, the capacitor element 2 is encapsulated in a housing 7 of a synthetic resin. Then, the lead frames 9, 90 are bent over peripheral surfaces of the housing 7. Thus, the solid electrolytic capacitor 1 is provided.

In the present invention, an electrically conductive paste for the formation of the mixture layer 4 essentially contains silver flake particles 8, carbon particles 80 and a binder.

Figure 2:
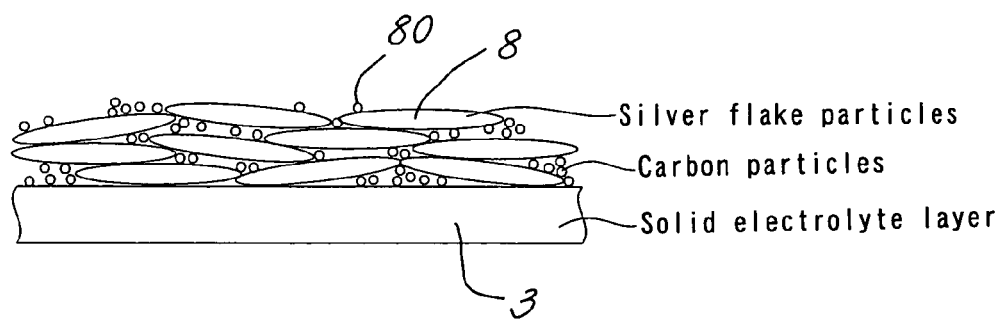
FIG. 2 is an enlarged diagram of silver flake particles and carbon particles.
Figure 3:
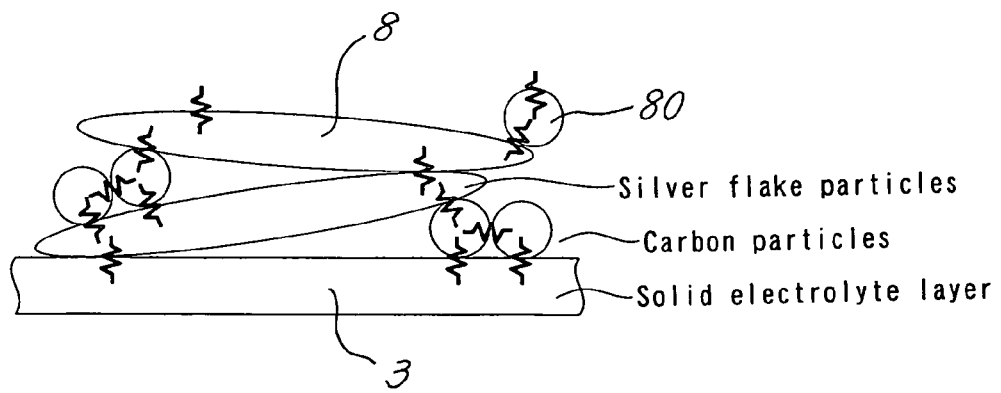
FIG. 3 is an enlarged diagram of the silver flake particles and carbon particles.
Figure 4:
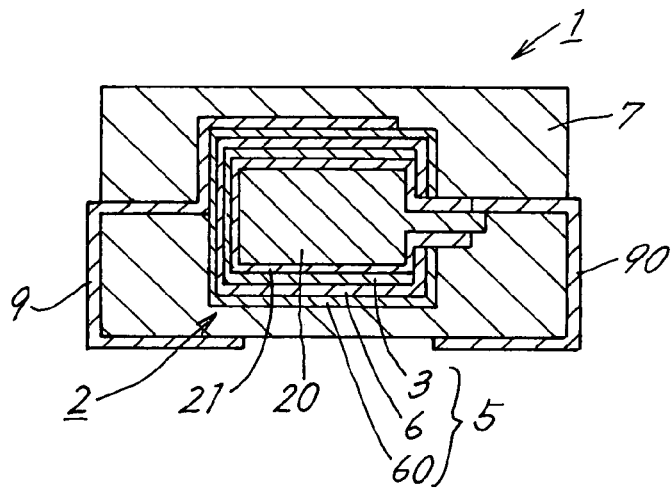
FIG. 4 is a sectional view of a conventional solid electrolytic capacitor as seen from the front side.
Figure 5:
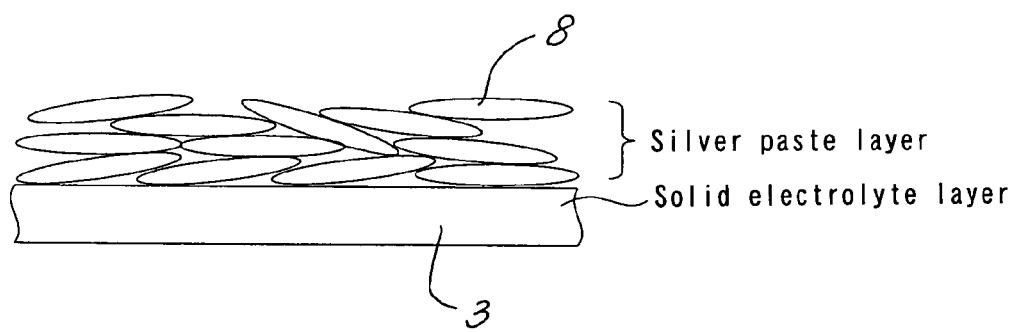
FIGS. 5 to 8 are enlarged diagrams of undesirable states of an interface between a silver paste layer and a solid electrolyte layer.
Figure 6:
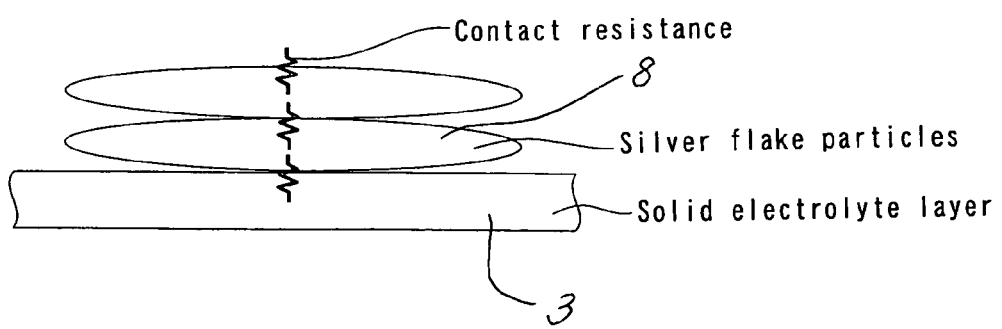
Figure 7:
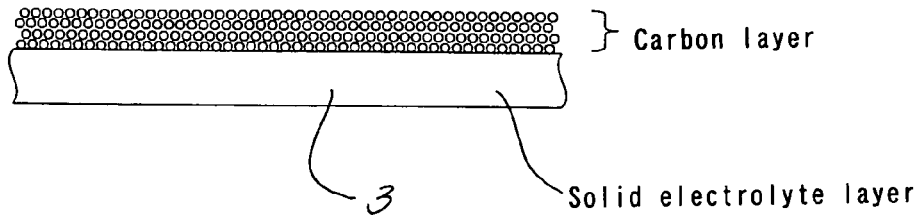
Figure 8:
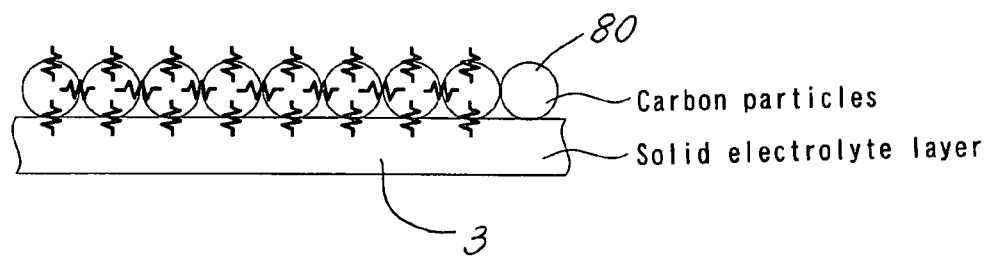
Figure 9:
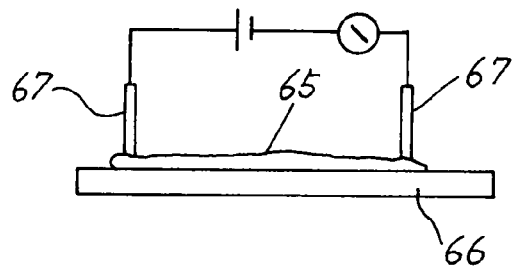
FIG. 9 is a diagram illustrating measurement of the electrical resistance of a conventional silver paste.

As shown in FIGS. 2 and 3, the silver flake particles 8 are prepared by physically flattening silver particles each having a granular, spherical or indefinite shape, and each have a greater surface area per volume. When the mixture layer 4 is formed, the silver flake particles lie on the solid electrolyte layer 3 as extending in the X- and Y-directions, thereby providing electrical conduction in the X- and Y-directions. Further, two adjacent silver flake particles 8, 8 contact each other with a greater contact area and, hence, provide a lower contact resistance, as compared with silver particles of a spherical or indefinite shape. Thus, the electrical conduction in the Z-direction can further be improved. Since the silver flake particles 8 have a greater specific surface area thereby to suppress sedimentation of the carbon particles, a greater number of carbon particles 80 can be inserted between the silver flake particles 8, 8.

Besides the silver flake particles, conceivable examples of conductive particles for the electrically conductive paste include copper particles and nickel particles. However, the copper particles and the nickel particles are susceptible to surface oxidation, thereby failing to exhibit the electrical conductivity without the use of a binder having a reducing property. In addition, it is difficult to flatten the copper particles and the nickel particles into the scaly shape because of poorer workability of the particles. Therefore, the copper particles and the nickel particles are not suitable for the electrically conductive paste for the solid electrolytic capacitor.

The carbon particles 80 are inserted between the solid electrolyte layer 3 and the silver flake particles 8 and between the silver flake particles 8. The carbon particles 80 auxiliarily increase the areas of contact between the silver flake particles and the solid electrolyte layer 3 and between the silver flake particles. Auxiliary electrical conduction provided by the carbon particles increases electrical conduction in the Z-direction as if parallel pseudo circuits were provided. As a result, the electrical conductivity of the laminate cathode 5 is increased, thereby reducing the ESR.

To provide such an effect, the carbon particles 80 preferably have a smaller average particle size than the silver flake particles 8. A specific example of the carbon particles is channel black having a specific surface area of 600 to 1200 $m^2/g$. The carbon particles having a smaller average particle size and a greater specific surface area generally have a multiplicity of minute pores on surfaces thereof. With the binder entering the minute pores, distances between the carbon particles 80, between the carbon particles 80 and the silver flake particles 8 and between the carbon particles 80 and the solid electrolyte layer 3 are remarkably reduced. This improves the contact efficiency. Ordinary carbon black (having a specific surface area of 5 to 350 $m^2/g$) has an insufficient specific surface area. Acetylene black (having a specific surface area of 15 to 100 $m^2/g$), furnace black (having a specific surface area of 15 to 300 $m^2/g$) and thermal black (having a specific surface area of 5 to 30 $m^2/g$), for example, cannot satisfy a conductivity requirement. On the contrary, the carbon particles used in the present invention have a very large specific surface area.

To provide the aforesaid effect, the mass ratio of the carbon particles 80 to the silver flake particles 8 is 0.77 to 10.8%, preferably 1 to 8%. If the ratio is lower than 0.77%, the distribution of the carbon particles 80 is insufficient. Therefore, the carbon particles 80 fail to provide a sufficient electrical conduction effect, thereby increasing the ESR. If the ratio is higher than 10.8%, the carbon particles have an increased total surface area, thereby reducing the fluidity of the binder. Therefore, the coating property of the resulting paste is remarkably deteriorated, though the electrical characteristics of the paste are not significantly influenced.

Examples of the binder include known organic compounds such as thermoplastic resins and thermosetting resins. Among these, thermosetting resins such as known thermosetting monomers, oligomers and polymers are preferably used, which are polymerizable by a thermosetting process. Specific examples of the thermosetting resins include phenol resins such as bisphenol-A, bisphenol-F, bisphenol-S, phenol novolak, and cresol novolak, epoxy resins having a phenol resin skeleton, and phenol resins and epoxy resins of a biphenyl type, a naphthalene type, a triphenylmethane type and a tetraphenylethane type. As required, primary, secondary and tertiary amines and carboxyl-containing compounds and anhydrides thereof may be used in combination as a curing agent or a curing catalyst.

According to the prior art, a capacitor element 2 including an anode body 20 formed with a solid electrolyte layer 3, and a carbon layer 6 and a silver paste layer 60 provided on the solid electrolyte layer 3 was produced, and a solid electrolytic capacitor 1 was produced by using the capacitor element 2. Silver flake particles having a specific surface area (a total particle surface area per unit weight) of 0.5 to 1.5 $m^2/g$ and an average particle size of 5 to 10 μm were used for a silver paste for the silver paste layer 60, and an epoxy resin having a molecular weight of 1000 to 3000 was used as a resin binder for the silver paste. As well known, the epoxy resin is a thermosetting resin.

In Examples 1 to 4 and Comparative Examples 2 to 4, capacitor elements 2 each including an anode body 20 formed with a solid electrolyte layer 3, and a mixture layer 4 of a mixture of silver flake particles 8 and carbon particles 80 provided on the solid electrolyte layer 3 were produced, and solid electrolytic capacitors 1 were produced by using the respective capacitor elements 2. In Comparative Example 1, a solid electrolytic capacitor 1 having substantially the same construction as the prior art capacitor but having no carbon layer 6 was produced.

The silver flake particles in the mixture layer 4 had a specific surface area of 1.0 $m^2/g$ and an average particle size of 3 μm. The carbon particles 80 had a specific surface area of 800 $m^2/g$ and an average particle size of 30 nm (=0.03 μm). An epoxy resin having a molecular weight of 1000 to 3000 was used as a binder for binding the silver flake particles and the carbon particles.

In Examples 1 to 4 and Comparative Examples 1 to 4, different types of silver flake particles and carbon particles and different mixing ratios were employed for the production of the solid electrolytic capacitors 1. In the solid electrolytic capacitors 1 of Examples 1 to 4 and Comparative Examples 1 to 4, no carbon layer 6 was provided. In the prior art solid electrolytic capacitor 1, the carbon layer 6 was provided. The silver particles used in the prior art, Examples 1 to 4 and Comparative Examples 1 to 3 had a scaly shape. The silver particles used in Comparative Example 4 had an indefinite shape. In the prior art, Examples 1 to 4 and Comparative Examples 1 to 4, the weight ratio between the binder and the solvent was 7:23 based on the silver particles, and only the amount of the carbon particles was changed. The characteristics of the mixture layers 4 formed in the prior art, Examples 1 to 4 and Comparative Examples 1 to 4 are shown in FIG. 11.

The ESRs (equivalent series resistances) shown in FIG. 13 were measured at a frequency of 100 kHz. In Comparative Example 2 in which the mass ratio of the carbon particles to the silver flake particles was higher than 10.8%, it was impossible to prepare the paste containing the silver particles and the carbon particles and, hence, the measurement was not performed.

The static capacitances of the solid electrolytic capacitors 1 of the prior art, Examples 1 to 4 and Comparative Examples 1, 3 and 4 were measured at a frequency of 120 Hz, and the ESRs and the specific resistances were measured. Further, leak currents were measured after a rated voltage was applied for 40 seconds. The solid electrolytic capacitors 1 each had a rated voltage of 25.0V and a static capacitance of 15 μF. The results of the measurement are shown in FIGS. 12 to 14. Ten solid electrolytic capacitors per lot were used for the measurement.

Figure 10:
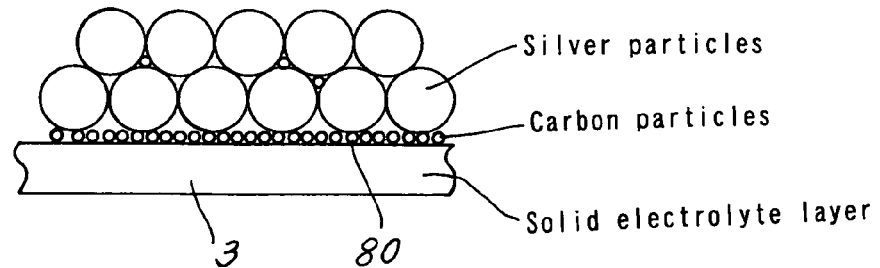
FIG. 10 is a diagram illustrating a state in which carbon particles settle down below silver particles.

As can be understood from FIGS. 12 to 14, the solid electrolytic capacitor 1 of Comparative Example 1 which had substantially the same construction as the prior art but had no carbon layer 6 and the solid electrolytic capacitor 1 of Comparative Example 3 in which the mass ratio of the carbon particles 80 to the silver flake particles 8 for the mixture layer 4 was lower than 0.77% each had a specific resistance comparable to the specific resistances of the solid electrolytic capacitors of the prior art and Examples 1 to 4, but had an increased ESR. The solid electrolytic capacitor 1 of Comparative Example 4 which was produced by using the silver particles of an indefinite shape instead of the silver flake particles had a reduced specific resistance and an increased ESR. Where a paste containing silver particles of a spherical or indefinite shape, carbon particles 80 and a binder is used for the formation of the mixture layer, the carbon particles 80 having a smaller particle size are liable to settle down below the silver particles thereby to be localized as shown in FIG. 10. Therefore, the number of carbon particles 80 inserted between the silver particles is supposedly reduced.

On the contrary, the solid electrolytic capacitors 1 of Examples 1 to 4 each having the mixture layer 4 each had a lower ESR than the solid electrolytic capacitor of the prior art. This is supposedly because the carbon particles 80 were positively inserted between the silver particles 8, 8 thereby to drastically reduce the ESR. In the present invention, the ESR of the solid electrolytic capacitor 1 was thus maintained at a lower level, while the production time was reduced as compared with the prior art in which the carbon layer 6 and the silver paste layer 60 were provided on the solid electrolyte layer 3.

Further, the experiment was performed with the mixing ratio between the silver particles and the carbon particles variously set. As a result, it was found that, where the ratio of the carbon particles to the silver particles was smaller than 0.77%, the ESR was excessively great. This is supposedly because the number of the carbon particles inserted between the silver flake particles 8, 8 and between the silver flake particles 8 and the solid electrolyte layer was not sufficiently great. On the other hand, where the ratio was greater than 10.8%, it was difficult to prepare the paste. Therefore, it is practical that the ratio of the carbon particles to the silver particles is 0.77 to 10.8%, preferably 1 to 8%. Where the specific surface area of the carbon particles was 600 to 1200 $m^2/g$, a practical ESR was provided.

What is claimed is:

1. A solid electrolytic capacitor comprising:
   an anode body formed with a dielectric oxide film; and
   a laminate cathode provided on the dielectric oxide film;
   wherein the laminate cathode comprises a solid electrolyte layer provided in contact with the dielectric oxide film, and a mixture layer of a mixture of silver flake particles and carbon particles provided directly on an outer surface of the solid electrolyte layer.

2. A solid electrolytic capacitor comprising:
   an anode body formed with a dielectric oxide film; and
   a laminate cathode provided on the dielectric oxide film;
   wherein the laminate cathode comprises a solid electrolyte layer provided in contact with the dielectric oxide film, and a mixture layer of a mixture of silver flake particles and carbon particles provided directly on an outer surface of the solid electrolyte layer, and
   wherein the carbon particles have a smaller average particle size than the silver flake particles, and are inserted between the silver particles and the solid electrolyte layer and between the silver particles for auxiliary electrical conduction.

3. A solid electrolytic capacitor as set forth in claim 2, further comprising a cathode lead frame which is connected to the cathode by an adhesive silver paste.

4. A solid electrolytic capacitor comprising:
   an anode body formed with a dielectric oxide film; and
   a laminate cathode provided on the dielectric oxide film;
   wherein the laminate cathode comprises a solid electrolyte layer provided in contact with the dielectric oxide film, and a mixture layer of a mixture of silver flake particles and carbon particles provided directly on an outer surface of the solid electrolyte layer,
   wherein a mass ratio of the carbon particles to the silver flake particles is 1 to 8%, and
   wherein the carbon particles has a specific surface area of 600 to 1200 $m^2/g$, and the silver flake particles have a specific surface area of 0.5 to 1.5 $m^2/g$.

5. A solid electrolytic capacitor as set forth in claim 4, wherein the solid electrolyte layer is composed of one of an electrically conductive polythiophene polymer and an electrically conductive polypyrrole polymer.

* * * * *